United States Patent [19]

Nakamura

[11] Patent Number: 4,784,247

[45] Date of Patent: Nov. 15, 1988

[54] VISCOUS FLUID COUPLING

[75] Inventor: Ryuji Nakamura, Okazaki, Japan

[73] Assignee: Aisin Seiki Kabushiki Kaisha, Kariya, Japan

[21] Appl. No.: 17,458

[22] Filed: Feb. 24, 1987

[30] Foreign Application Priority Data

Feb. 21, 1986 [JP] Japan .................................. 61-036871

[51] Int. Cl.$^4$ ........................ F16D 35/00; F16D 43/25
[52] U.S. Cl. .................................. 192/58 B; 192/82 T
[58] Field of Search ............................. 192/58 B, 82 T

[56] References Cited

U.S. PATENT DOCUMENTS

| | | | |
|---|---|---|---|
| 3,613,847 | 10/1971 | Masai | 192/58 B |
| 3,809,197 | 5/1974 | Clancey | 192/58 B |
| 4,665,694 | 5/1987 | Brunken | 192/58 B X |

Primary Examiner—Rodney H. Bonck
Attorney, Agent, or Firm—Oblon, Fisher, Spivak, McClelland & Maier

[57] ABSTRACT

In a viscous fluid coupling which is essentially composed by one rotor, the other rotor, a first oil storage chamber and a valve, the one rotor fixed to an input member and the other rotor fixed to an output member are combined to form an operation chamber. The first oil storage chamber is formed between the other rotor and the output member, and the valve opens and closes a port of an oil passage which communicates the first oil storage chamber with the operation chamber under control of a temperature sensitive member attached to the output member. In this construction a case fixed to the output member covers a side surface opposite to the rotors. A second oil storage member is disposed in a position corresponding to the first oil storage chamber between one rotor and the case. With this arrangement, a so-called taking-around phenomenon which is present when the operation of the viscous fluid coupling resumes can be eliminated.

2 Claims, 3 Drawing Sheets

VISCOUS FLUID COUPLING

BACKGROUND OF THE INVENTION

1. Field of the Invention

The present invention relates to a viscous fluid coupling suitable for an automobile machinery such as, a cooling fan or the like.

2. Description of the Prior Art

A conventional viscous fluid coupling is disclosed in the specification of, for instance, Japanese Patent Laid-Open No. 69336/1980. This type of coupling will be explained with reference to FIG. 3. A rotor 1 is fixed to an input shaft 2. Operation chambers 5a, 5b are formed between a case 3 and a cover 4 (an output shaft) fixed to the case 3. The operation chambers 5a, 5b are filled with viscous fluid, whereby torque is propagated from the input shaft 2 to the output shaft. The reference numeral 6 stands for a storage chamber, 7 represents a temperature sensitive member and 8 denotes a rod. The temperature sensitive member 7 is linked through the rod 8 to a valve 9. This valve 9 opens and closes through the intermediary of the rod 8 in response to a temperature that the sensitive member 7 senses. Propagation of torque from the input shaft 2 to the output shaft is controlled by regulating the viscous fluid pumped between the operation chambers 5a, 5b and the storage chamber 6.

There is, however, a defect in the viscous fluid coupling depicted in FIG. 3. The viscous fluid becomes stagnant in the lower portion of the coupling by reason of no power during non-operational a period, so that that viscous fluid, as shown in FIG. 4, fills the operation chambers 5a, 5b as well as the storage chamber 6. The torque is propagated from the input-side by the viscous fluid with which the operation chambers 5a, 5b are filled when the operation resumes. The fan continues to rotate undesirably at a high velocity till the viscous fluid is pumped from the operation chambers 5a, 5b into the storage chamber 6.

In such a case, if the atmosphere is adequately high in temperature and the valve is thus kept open, no problem is produced. However, if the atmosphere is at a low temperature, there arise problems such as deterioration both in warming-up speed of the machinery and in the efficiency of a heater, or the creation of noises caused by the fan immediately after restarting the operation.

A conventional viscous fluid coupling has been proposed in the specification of Japanese Patent Laid-Open No. 190521/1984 to obviate the above-described defects. Such is the arrangement that a plurality of floats are provided in the storage chamber; each individual float is subjected to a force given by an elastic member and is positioned towards the axial center of the storage chamber while the engine stops; and the floats move to the outer periphery of the storage chamber by centrifugal forces created by rotation of an output member, resisting the force given by the elastic member. With this arrangement, a so-called taking-around phenomenon that is present when the engine starts can be eliminated. In this case, however, the components increase in number and hence the structure become complicated with a heavier weight. Consequently, the costs of production go up.

SUMMARY OF THE INVENTION

It is the primary object of the present invention to obviate the above-described problems like deterioration both in a machinery and in efficiency of a heater when the atmosphere is low in temperature and an increase in cost of production, which are inherent in conventional viscous fluid couplings, and to provide viscous fluid coupling which has: one rotor fixed to an input member; the other rotor fixed to an output member, these two rotors being combined to form an operation chamber; a first oil storage chamber formed between the other rotor and the output member; and a valve for opening and closing a port of an oil passage which communicates the storage chamber with the operation chamber under control of a temperature sensitive member attached to the output member, an improvement characterised by comprising: a case fixed to the output member for covering a side surface opposite to the rotors; and a second storage chamber disposed in a position corresponding to the first storage chamber between foregoing one rotor and the case.

When the output member comes to a halt, the oil is stored in the first storage chamber provided at the lower portions of the viscous fluid coupling, the operation chamber and the second storage chamber. Immediately when the operation begins, the oil spreads over the circumference thereof within the viscous fluid coupling by the centrifugal forces and is then collected in the first storage chamber with almost no propagation of torque of the viscous fluid coupling from the operation chamber and from the second storage chamber due to the lower oil level. If the operation starts when the temperature of the atmosphere is sufficiently high, the temperature sensitive member senses a high temperature, whereby opening control of the valve is effected. When the valve is opened, i.e., the viscous fluid coupling is turned ON, the oil flows from the first storage chamber into the operation chamber, thereby propagating the torque. While on the other hand, if the operation starts when the atmosphere decreases in temperature, the valve is closed because of the fact that the same member senses a low temperature. Namely, the viscous fluid coupling is turned OFF, and the oil is collected from the operation chamber into the first storage chamber. As a result, no torque is propagated and it is therefore feasible to restrain the rotation of the fan.

These and other objects, features and advantages of the invention will become more apparent on reading the following detailed description with reference to the accompanying drawings.

DETAILED DESCRIPTION OF THE PREFERRED EMBODIMENT

Figure 1:
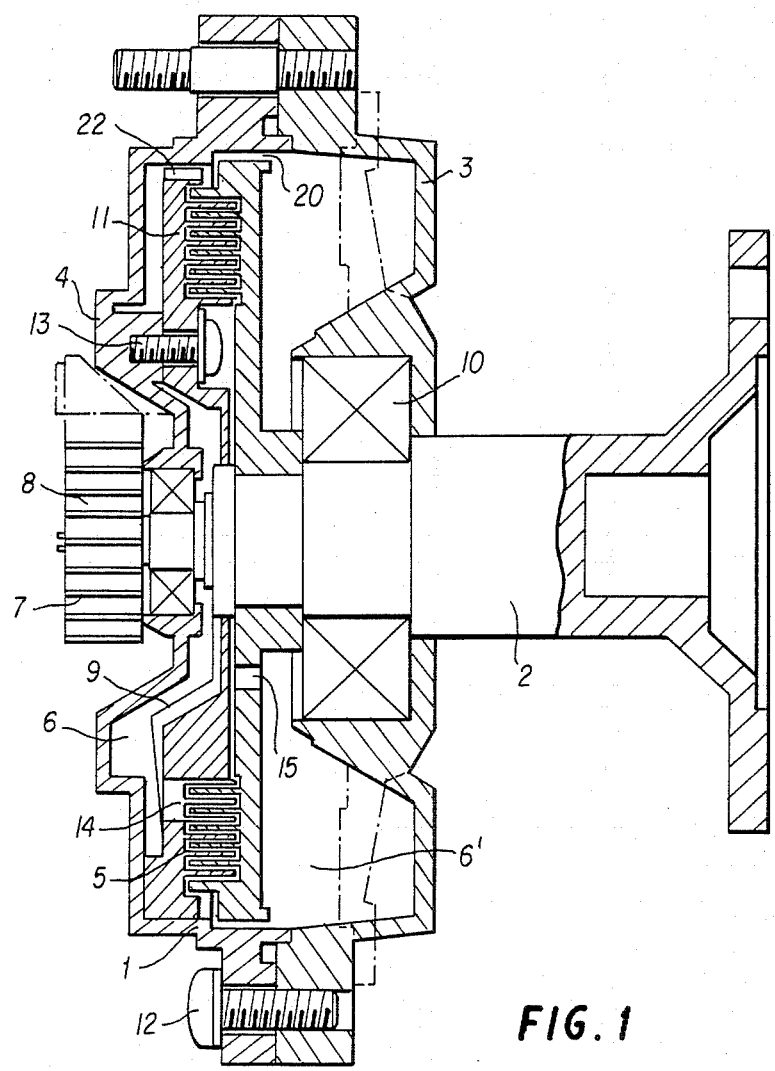
FIG. 1 is a side sectional view of a viscous fluid coupling, showing one embodiment of the present invention.
Figure 3:
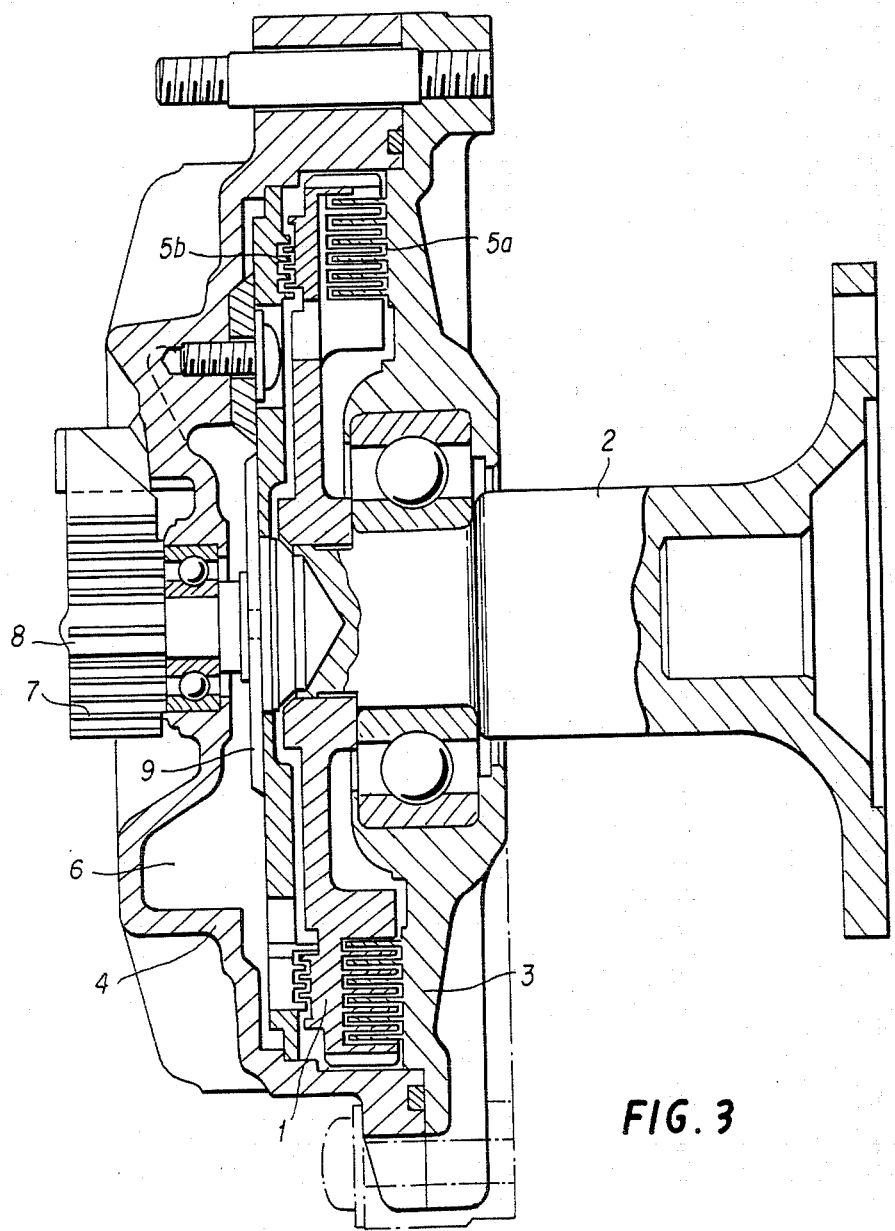
FIG. 3 is a side sectional view of a conventional viscous fluid coupling.

The present invention will hereinafter be described with reference to the accompanying drawings. FIG. 1 shows one embodiment of the present invention. In FIG. 1, the same components as those illustrated in FIG. 3 are marked with the same symbols. It can be observed from FIG. 1 that a rotor 1 is secured to an input shaft 2, and teeth 20 oriented corresponding to a direction of rotation are formed on the outer periphery thereof for pumping the viscous fluid. A case 3 is rotatably supported through a bearing 10 on the input shaft 2 and is fixed to a cover 4 (an output member) with a screw 12. A second storage chamber 6' is provided between the case and the rear portion of the rotor 1.

The reference numeral 11 designates a divider plate (a rotor) which is fastened to the cover 4 with a screw 13. An operation chamber 5 assuming a labyrinthine configuration is formed between the rotor 1 and the divider plate 11. The valve 9 is secured through a rod 8 to a bimetal 7 (a temperature sensitive member). An oil passage port 14 of the divider plate 11 is closed and opened in accordance with a motion of the valve 9 relative to temperatures of the bimetal 7. On the basis of this motion is controlled an amount of inflow of the oil from the first storage chamber 6 to the operation chamber 5, thereby controlling the propagation of torque from the input shaft 2 to the output-side.

Figure 2:
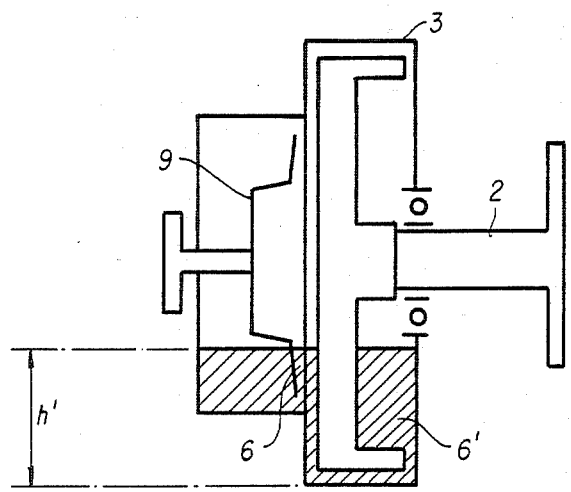
FIG. 2 is a view showing a height of oil level during a non-operative period in the viscous fluid coupling according to the present invention.
Figure 4:
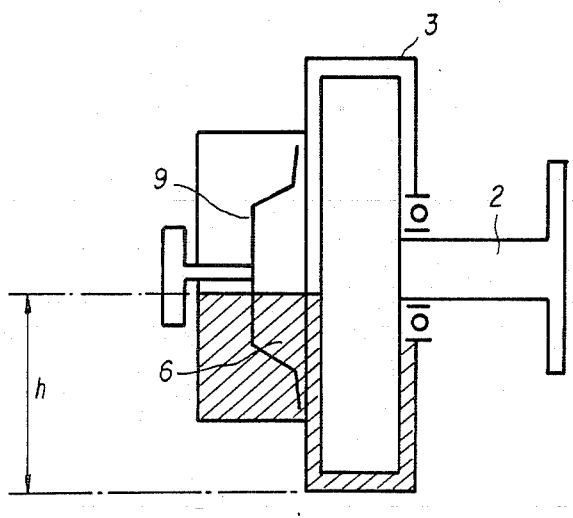
FIG. 4 is a view showing a height of oil level during a non-operative period in the conventional viscous fluid coupling.

In the next place, the operations will be explained as follows. The silicon oil is stored in the storage chamber 6 disposed at the lower portion within the viscous fluid coupling, the operation chamber 5 and the second storage chamber 6' because of its own weight during a non-operative period. When the operation starts, the silicon oil spreads over the circumference thereof within the viscous fluid coupling by reason of the centrifugal forces of the rotation and is then pumped both from the operation chamber 5 and the second storage chamber 6' into the first storage chamber 6. At this time, the silicon oil which is to be collected from the second storage chamber 6' is collected into the storage chamber 6 with almost no propagation of torque. As described above, a capacity of the second storage chamber 6', i.e., a height h' of silicon oil level (see FIG. 2) in a non-operative time is lower than the height h of oil level shown in FIG. 4 in the previous case and hence it is possible to eliminate the taking-around phenomenon which is present when the viscous fluid coupling begins its operation.

A depressurizing hole 15 formed in the rotor 1 is intended to permit smooth collection of the silicon oil from the second storage chamber 6' when the operation resumes by equalizing pressures between the chambers. This depressurizing hole 15 is indispensable for the present invention. A position of the depressurizing hole 15 is closer to the inner periphery than the level of the silicon oil when the viscous fluid coupling goes on rotating, viz., a position in which it never be dipped in the silicon oil. In this case, it is required that no leakage from the operation chamber which is operating to transfer torque into the second storage chamber 6' is generated.

Upon a start of operation when the atmosphere is at a high temperature, the bimetal 7 senses the temperature, whereby the valve 9 is so controlled as to open. When the valve is opened, viz., the viscous fluid coupling is turned ON, the silicon oil flows from first storage chamber 6 into the operation chamber 5, thereby propagating the torque. At this time, however, the silicon oil does not flow from the operation chamber 5 into the second storage chamber 6' at all. The reason for this is that the operation chamber 5 and the second storage chamber 6' are, as explained earlier, sealed against flow into second storage chamber 6' at the outer periphery of the rotor 1 by virtue of relative rotation between the rotor 1 and the cover 4 and of the centrifugal force as well as pumping action caused by the teeth formed on the outer periphery of the rotor 1 and angled in conformity with the rotary direction thereof. Accordingly, the least required amount of silicon oil permits the viscous fluid coupling to be operated.

When the atmosphere is at a low temperature and the operation starts, the valve is closed by a step wherein since the bimetal 7 senses the low temperature, that is, the viscous fluid coupling is in an OFF state. The silicon oil is pumped from the operation chamber 5 into the storage chamber 6 by a conventional pumping device such as that indicated at 22 in FIG. 1 and shown at 35-37 in U.S. Pat. No. 4,665,694, at which time no torque is propagated. The rotation of the fan can therefore be restrained. As a matter of course, if a wall surface of the outer periphery of the second storage chamber 6', as illustrated in FIG. 1, is angled towards the rotor 1, the effectiveness is enhanced, as residual oil in the second storage chamber 6' will then flow towards the rotor.

As can be clarified from the description so far made, the present invention yields the following effects. Since the second storage chamber is provided at the rear of the rotor in addition to the conventional first storage chamber, the height h' of oil level in a non-operative period of time is descreased in proportion to the capacity of the second storage chamber. In consequence, the taking-around phenomenon which is present when the operation resumes can be eliminated. According to the present invention, with a simple construction, an increase in weight can be minimized and the costs of production do not increase. It is feasible to perform the same or more sophisticated functions. Furthermore, inasmuch as only the arrangement in which the conventional components are modified to a small extent suffices, still slighter influences are exerted on the peripheral parts relative to loading of a car.

As many widely different embodiments of this invention may be made without departing from the spirit and scope thereof, it is to be understood that the invention is not limited to the specific embodiments thereof except as defined in the appended claims.

What is claimed is:

1. A viscous coupling comprising:
   one rotor fixed to an input member;
   an output member;
   an other rotor fixed to said output member, said rotors cooperating to define an operation chamber;
   case means fixed to said output member, said case means and output member enclosing said rotors;
   a first oil storage chamber formed between said output member and said other rotor;
   an oil passage communicating said first oil storage chamber with said operation chamber;
   a temperature sensitive member attached to said output member;
   valve means responsive to said temperature sensitive member for selectively opening and closing said oil passage;
   a second oil storage chamber formed between said one rotor and said case and being radially positioned such that at least a part thereof is adjacent a radially outside portion of said operation chamber;
   a depressurizing hole formed in said one rotor and comprising means for equalizing a pressure between said first and second oil storage chambers; and oil filled in said case means to a level such that a top surface of said oil does not reach said depressurizing hole when said one rotor is stationary.

2. A viscous fluid coupling as set forth in claim 1, wherein a radially outer wall surface of said second oil storage chamber is angled in such a direction that a volume of said second oil storage chamber expands towards said one rotor.

* * * * *

UNITED STATES PATENT AND TRADEMARK OFFICE
CERTIFICATE OF CORRECTION

PATENT NO. : 4,784,247

DATED : November 15, 1988

INVENTOR(S) : RYUJI NAKAMURA

It is certified that error appears in the above-identified patent and that said Letters Patent is hereby corrected as shown below:

Column 1, line 7, delete "an";

line 32, change "non-operational a" to --a non-operational--;

line 33, after "that" insert --the--.

Column 2, line 4, after "provide" insert --a--.

Column 3, line 57, after "temperature" (second occurrence) insert --,-- line 58, delete ",".

Column 4, line 8, delete "wherein".

line 32, after "minimized" insert --,--.

Signed and Sealed this

Eleventh Day of April, 1989

Attest:

DONALD J. QUIGG

*Attesting Officer*  *Commissioner of Patents and Trademarks*